United States Patent
Oishi

(10) Patent No.: US 7,440,232 B2
(45) Date of Patent: Oct. 21, 2008

(54) MULTI-DISK CARTRIDGE AND DISKS WITH INTERLOCKING SPACERS FOR STACKING

(75) Inventor: Kengo Oishi, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 434 days.

(21) Appl. No.: 11/191,926

(22) Filed: Jul. 29, 2005

(65) Prior Publication Data
US 2006/0039083 A1  Feb. 23, 2006

(30) Foreign Application Priority Data
Aug. 19, 2004  (JP) ............................. 2004-239628

(51) Int. Cl.
*G11B 23/03* (2006.01)
(52) U.S. Cl. .................... 360/133; 720/725; 369/30.42; 369/30.68
(58) Field of Classification Search ................ 360/133; 720/720–725, 728; 369/30.42, 30.53, 30.68, 369/30.83
See application file for complete search history.

(56) References Cited

U.S. PATENT DOCUMENTS

| 3,817,088 A | * | 6/1974 | Herbig ........................... 73/66 |
| 4,065,799 A | * | 12/1977 | Kaczeus ..................... 360/135 |
| 4,330,803 A | * | 5/1982 | Karol ....................... 360/98.05 |
| 4,458,277 A | * | 7/1984 | Ragle et al. ............... 360/98.03 |
| 4,607,304 A | * | 8/1986 | DeMoss et al. ............. 360/133 |
| 4,636,891 A | * | 1/1987 | Barski ....................... 360/97.02 |
| 4,945,432 A | * | 7/1990 | Matsudaira et al. ....... 360/98.02 |
| 5,220,938 A | * | 6/1993 | Kley ............................ 137/88 |
| 5,415,291 A | * | 5/1995 | Fukagawa ................ 206/308.3 |
| 5,453,898 A | * | 9/1995 | Mizuta et al. .............. 360/133 |
| 5,581,540 A | * | 12/1996 | Dang .......................... 720/729 |
| 6,165,581 A | * | 12/2000 | Sasaki ........................ 428/64.5 |
| 6,901,600 B2 | * | 5/2005 | Liu ............................. 720/719 |
| 2006/0050434 A1 | * | 3/2006 | Oishi .......................... 360/133 |

FOREIGN PATENT DOCUMENTS

| JP | 02-094188 A | 4/1990 |
| JP | 02-239484 A | 9/1990 |
| JP | 04-176069 A | 6/1992 |
| JP | 2004-22011 A | 1/2004 |

* cited by examiner

*Primary Examiner*—Brian E. Miller
*Assistant Examiner*—Matthew G Kayrish
(74) *Attorney, Agent, or Firm*—Sughrue Mion, PLLC

(57) ABSTRACT

A recording disk cartridge includes a plurality of flexible recording disk media integrally rotatably housed within a cartridge case. Each of the recording disk media is fixed to a center core which is stacked one on another through a spacer. The cartridge case includes: a lower plate for configuring a lower wall parallel to the plurality of the recording disk media; at least one inner plate that is stacked and fixed on the lower plate, and partitions the plurality of the recording disk media; and an upper plate that is stacked and fixed on the inner plate, and configures an upper wall of the cartridge case. Each spacer is provided with locking protrusions at upper and lower surfaces thereof, and each center core is provided with locking holes for engagement with the locking protrusions of adjacent spacers.

17 Claims, 7 Drawing Sheets

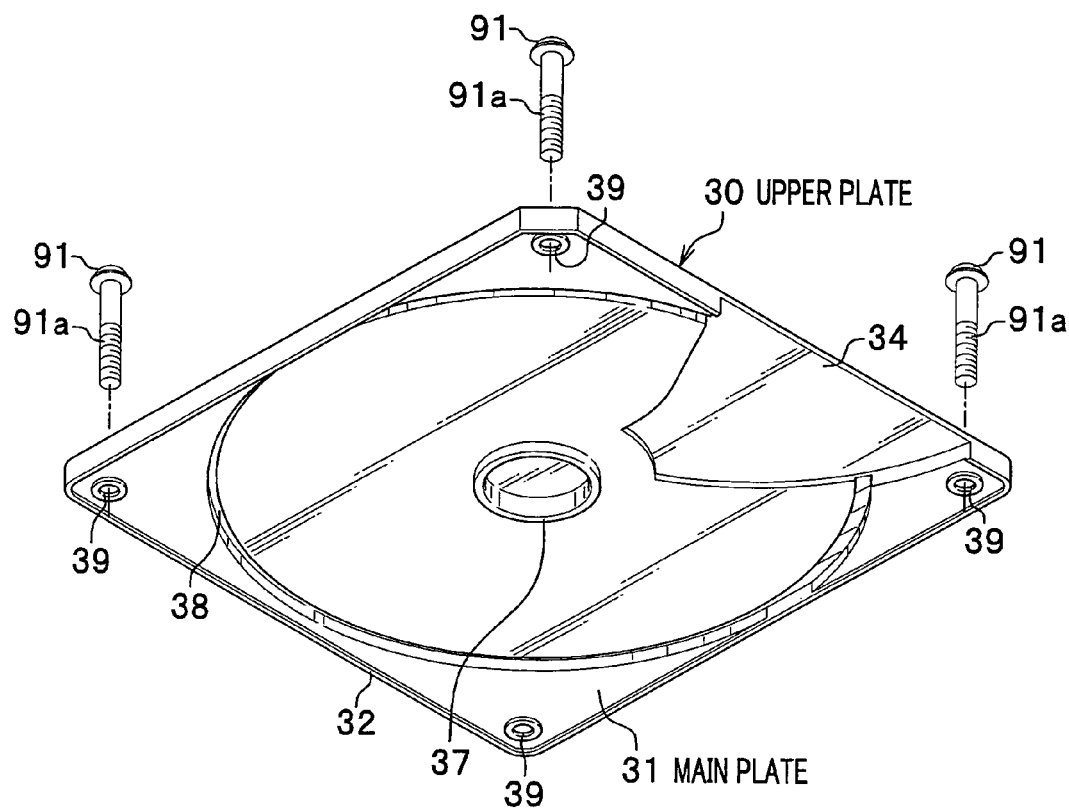

MULTI-DISK CARTRIDGE AND DISKS WITH INTERLOCKING SPACERS FOR STACKING

CROSS REFERENCE TO RELATED APPLICATIONS

This application claims the foreign priority benefit under Title 35, United States Code, §119(a)-(d) of Japanese Patent Application No. 2004-239628, filed on Aug. 19, 2004 in the Japan Patent Office, the disclosure of which is herein incorporated by reference in its entirety.

BACKGROUND OF THE INVENTION

1. Field of the Invention

The present invention relates to a recording disk cartridge comprising a plurality of flexible recording disk media.

2. Description of the Related Art

Conventionally, as a recording disk medium a flexible recording disk medium is known where a magnetic layer is formed on both faces of a disc-form support body consisting of a flexible material such as a polyester sheet. Although the magnetic disk medium has a merit of speedily accessing data in comparison with a magnetic tape, on the other hand, it has a demerit of a memory capacity being small because a recording area thereof is small.

In order to solve the demerit of the flexible magnetic disk medium, it is conventionally disclosed a magnetic disk cartridge for housing a plurality of magnetic disk media in one cartridge case (for example, see JP 2004-22011A).

In this connection, because a flexible magnetic disk medium is low in rigidity thereof, there is a problem that the medium tends to vibrate in a vertical direction of a recording face when rotated. Therefore, in an invention of JP 2004-22011A each magnetic disk medium is made a configuration of being pinched by shutters. Thus by arranging plate members of high rigidity such as the shutters in a vicinity of the magnetic disk medium, the recording face can be stabilized because the medium becomes along the plate members, accompanied with a rotation of the medium.

However, because a magnetic disk cartridge of JP 2004-22011A is configured of movable shutters arranged by four for one magnetic disk medium, there is a problem that the cartridge is complicated in a structure thereof and is difficult to keep a parallelism to the medium. In addition, because the magnetic disk cartridge is mass produced goods, it is preferable to be excellent in assembling ability and productivity. It is also preferable that the magnetic disk cartridge excels in rotational stability. Furthermore, the magnetic disk cartridge is preferable to be high in a degree of freedom in a design change so as to easily set a plurality of kinds thereof where the number of magnetic disk media is made three, five, and the like.

In addition, because the magnetic disk cartridge has a possibility of generating an error in recording/reproducing data due to an invasion of dust, it is necessary to prevent the invasion of the dust.

From such a background is strongly requested a recording disk cartridge having a simple structure, excellent in assembling ability, productivity, and rotational stability, and also easy in changing a number of recording disk media.

SUMMARY OF THE INVENTION

It is an aspect of the present invention to provide a recording disk cartridge including a plurality of flexible recording disk media integrally rotatably housed within a cartridge case, wherein each of said recording disk media is fixed to a center core which is stacked one on another through a spacer. The cartridge case comprises: a lower plate for configuring a lower wall parallel to the plurality of the recording disk media; at least one inner plate that is stacked and fixed on the lower plate, and partitions the plurality of the recording disk media; and an upper plate that is stacked and fixed on said inner plate, and configures an upper wall of the cartridge case. Each spacer is provided with locking protrusions at upper and lower surfaces thereof, and each center core is provided with locking holes for engagement with the locking protrusions of adjacent spacers.

In accordance with such the configuration, in the recording disk cartridge of the present invention the cartridge case is configured in a form of stacking up the lower plate, the inner plate, and the upper plate. Therefore, a pair of the inner plate and the recording disk medium is made one unit, all inner plates can be made a same part, and therefore, the recording disk cartridge is excellent in productivity. And because the recording disk medium in an assembling process can also be carried by making a lower plate and an inner plate as a substitute of a tray, the recording disk cartridge is excellent also in assembling ability without damaging and staining the medium. In addition, in a case that it is intended to make a specification of changing a number of recording disk media, it is easy to change the specification because it suffices to mainly change a number of inner plates. Furthermore, because an inner plate of a partition plate is fixed as part of the cartridge case, the recording disk cartridge is easy to realize accuracy such as a parallelism to the recording disk media and can heighten a rotational stability especially at a high speed such as 2000 to 8000 rpm.

In addition, in a recording disk cartridge according to the present invention, each center core is engaged with the spacer with the locking protrusions of the spacer entered into the corresponding locking holes of the center core, so that a plurality of center cores can be integrally rotatable. Therefore, it is possible to improve rotational stability of the plurality of recording disk media. Furthermore, a plurality of center cores are readily assembled with each center core and the spacer being engaged each other, leading to excellent assembling ability.

In the aforementioned recording disk cartridge, the locking protrusions may be arranged equidistantly along a circle of which center is a rotation axis of the spacer, so that the combination of the center cores can be strengthened during the rotation thereof.

In the aforementioned recording disk cartridge, the locking protrusions may be arranged so as to protrude alternately at an upper side and a lower side of the spacer. This can strengthen the combination of the center cores at upper and lower layers.

Further, in the aforementioned recording disk cartridge, the number of locking protrusions for engagement with the upper side and the lower side of the center core may be at least two each.

In the aforementioned recording disk cartridge, the locking holes may be penetration holes formed in the center core, and a height of each locking protrusion may be greater than a thickness of the center core. Further, the spacer may be provided with recesses, a depth of each recess is greater than a protrusion amount of each locking protrusion that protrudes from the corresponding locking hole. Therefore, it is possible to provide a reliable engagement between the spacer and the center core.

In the aforementioned recording disk cartridge, the center core may comprise a circular bottom plate, a cylindrical side wall rising from a peripheral rim of said bottom plate, and a flange widening in an outer diameter direction from an upper end of said side wall. And, a plurality of locking holes may be provided around a center hole located in center of said bottom plate to surround said center hole.

In the aforementioned recording disk cartridge, the spacer may comprise a ring-shaped main body portion having a plurality of penetration holes. And, the locking protrusions may be pins pressed into said penetration holes.

Further, in the aforementioned recording disk cartridge, the penetration holes may be formed in positions corresponding to said locking holes of said center core. And each of the penetration holes may be formed so that a small diameter hole portion into which said pin is pressed is coaxially adjacent to a large diameter hole portion whose diameter is larger than said small diameter hole portion.

In the aforementioned recording disk cartridge, adjacent penetration holes of said spacer may be arranged such that the small diameter hole portion and the large diameter hole portion are located upside down.

In the aforementioned recording disk cartridge, an end of said pin may be located on a boundary between said small diameter hole portion and said large diameter hole portion, and the other end of said pin may protrude outside said small diameter hole portion.

Further, in the aforementioned recording disk cartridge, when said center core is stacked one on another through the spacer, each of said pins of the spacer may extend through the corresponding locking hole of said center core and position in said large diameter hole portion of another adjacent spacer.

According to the present invention, the recording disk medium may be a magnetic disk medium. Also, the recording disk medium may be an optical disk medium.

BRIEF DESCRIPTION OF THE DRAWINGS

FIG. 3 is a perspective view showing an inner face of an upper plate.

DESCRIPTION OF THE PREFERRED EMBODIMENTS

Here will be described an embodiment of the present invention in detail, referring to drawings as needed. In the embodiment will be described a case of adopting a magnetic disk medium as an example of a recording disk medium.

Meanwhile, in a description below, with respect to up/down directions, making it a standard a typical use state of the magnetic disk cartridge, vertical directions for faces of magnetic disk media are called the up/down directions for convenience.

Figure 1:
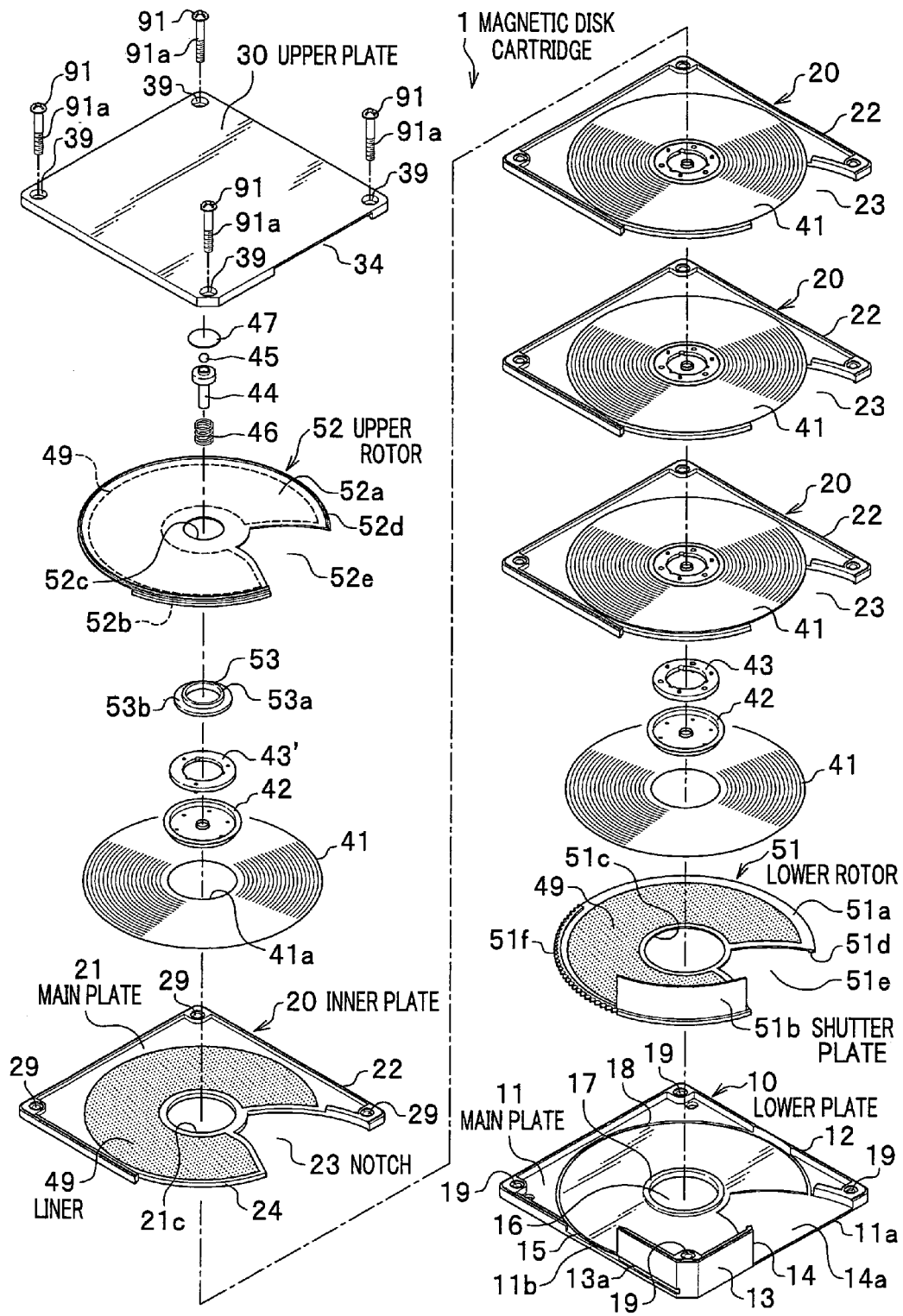
FIG. 1 is an exploded perspective view of a magnetic disk cartridge according to one embodiment of the present invention.

As shown in FIG. 1, in a magnetic disk cartridge 1 of an example of a recording disk cartridge are stacked a lower plate 10 for configuring a lower wall thereof; a plurality of, for example, four inner plates 20, and an upper plate 30 for configuring an upper wall thereof in this order; these are fastened and fixed with four screws 91; and thereby a cartridge case 2 (see FIG. 2A) is configured. Between the lower plate 10 and the lowermost inner plate 20, between any adjacent two of the four inner plates 20, and between the uppermost inner plate 20 and the upper plate 30 is arranged a magnetic disk medium 41, respectively. Each magnetic disk medium 41 is a disc form having an opening 41a at center thereof, and a center core 42 made of metal is affixed at the rim of the opening 41a. It is designed that any adjacent two center cores 42 are engaged by spacers 43, 43', and that five magnetic disk media 41 (the magnetic disk media 41 stacked and integrated are assumed to be a disk stack 40) are integrally rotated.

Figure 2A:
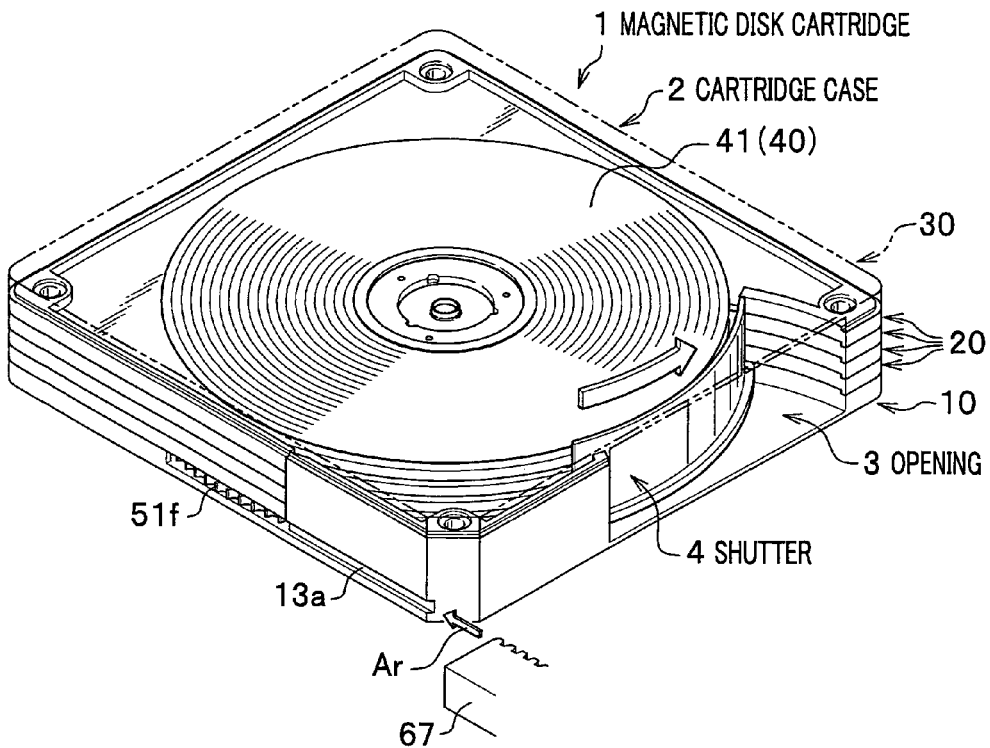
FIG. 2A is an external perspective view of the magnetic disk cartridge with a shutter closed.

In each of the inner plates 20 is formed a rib 22 for abutting with upper/lower plates at a peripheral rim of a flat main plate 21. Part of a right near side of each of the inner plates 20 in FIG. 1 forms a notch 23 so that magnetic heads 63 (see FIG. 4) can easily move onto the magnetic disk media 41. At the portion of the notch 23 is not formed the rib 22, and therefore, when the inner plates 20 are stacked up, an opening 3 is formed on a side face of the cartridge case 2 as shown in FIG. 2A.

The opening 3 is opened/closed by a shutter 4 that coaxially rotates with the disk stack 40. As shown in FIG. 1, the shutter 4 is configured by combining a lower rotor 51 and an upper rotor 52.

Next will be described each member in more detail.

The lower plate 10 is designed at a peripheral rim of a main plate 11 of a substantially square to mainly form a side wall 13 and a rib 12 for abutting with a lower face of the rib 22 of the lowermost inner plate 20. The side wall 13 is vertically provided in a predetermined range, for example, around one third range of one edge, from one corner of the main plate 11 (near side corner in FIG. 1), and is formed approximately in height of the inner plates 20 stacked.

A sector portion toward a center of the main plate 11 from one edge 11a (one edge of right near side in FIG. 1) continuing into the side wall 13 of the main plate 11 is designed to form a depression 14a lowered by one step, not to form the rib 12 at the peripheral rim of the main plate 11, and to become an opening 14. Thus it becomes easy for the magnetic heads 63 to proceed into the cartridge case 2.

An approximately central one third range of the other edge 11b (one edge of left near side in FIG. 1) continuing into the side wall 13 of the main plate 11 is designed not to form the rib 12 but to become an opening 15 so that a gear 51f of the lower rotor 51 described later can be exposed. In addition, outside the side wall 13 of the other edge 11b is formed a groove 13a along a periphery of the lower plate 10, continuing into the opening 15. The groove 13a is designed to be a passage where a shutter open gear 67 (see FIG. 2A) of a magnetic disk drive proceeds in a direction shown in an arrow Ar of FIG. 2A and enters in the opening 15 in order to engage in the gear 51f.

The rib 12 is formed so as to protrude upward across all periphery except the side wall 13 and the openings 14,15 out of a peripheral rim of the main plate 11. At center of the main plate 11 is formed a circular opening 16 for exposing the center core 42 provided inside the lowermost magnetic disk medium 41. At upper rim of the opening 16, across all periphery thereof is formed a rib 17 outside which a central opening 51c formed at center of the lower rotor 51 fits. The rib 17 rotationally freely supports the lower rotor 51.

In addition, on an upper face (inner face) of the main plate 11 is formed a circular lower rotor support groove 18 at a position corresponding to peripheral rim of the lower rotor 51. The lower rotor support groove 18 rotationally freely supports the lower rotor 51 coaxially with the magnetic disk media 41 by engaging in a rib 51d (see FIG. 4) formed downward at a peripheral rim of the lower rotor 51.

In addition, at four corners of the main plate 11 are formed screw holes 19 where female threads are formed, respectively, with penetrating through the up/down directions.

The main plate 21 of each of the inner plates 20 is substantially a square, and a portion corresponding to one of four corners of the square is designed to be an arc (arc portion 24) one size larger than the magnetic disk medium 41. At one edge (right near side in FIG. 1) continuing into the arc portion 24 is formed the notch 23 into a sector. The rib 22 protrudes the up/down directions and is formed across all periphery except the arc portion 24 and the notch 23 out of periphery rim of the main plate 21. At center of the main plate 21 is formed a central opening 21c for enabling the upper center core 42 to be exposed and to be coupled with the lower center core 42.

In addition, at three corners of the main plate 21, with penetrating through the three corners in the up/down directions, are formed holes 29 through which screw shaft portions 91a of the screws 91 are inserted, respectively.

The upper plate 30 is formed substantially symmetric to the lower plate 10. As shown in FIG. 3, in the upper plate 30, on a substantially square main plate 31 are formed a depression 34 corresponding to the depression 14a, a rib 37 corresponding to the rib 17, and an upper rotor support groove 38 corresponding to the lower rotor support groove 18. Meanwhile, at center of the main plate 31 are not formed an opening and a side wall corresponding to the side wall 13.

In addition, at a peripheral rim of the main plate 31, across all periphery except the depression 34 is formed a rib 32 protruding downward.

In addition, at four corners of the main plate 31 are respectively formed holes 39 that enables the screw shaft portions 91a of the screws 91 to be penetrated therethrough.

The lower rotor 51 is designed so that: a central opening 51c, a notch 51e, a rib 51d, and the gear 51f are formed on a ring-form lower rotor plate 51a substantially same as the magnetic disk media 41; and a shutter plate 51b is vertically provided at the peripheral rim of the lower rotor plate 51a. The central opening 51c is formed as a circle fitting outside the rib 17, the notch 51e is formed as a sector corresponding to the depression 14a. In addition, the rib 51d is provided downward at a peripheral rim of a lower face of the lower rotor plate 51a, corresponding to the lower rotor support groove 18.

The shutter plate 51b is a blocking member for blocking the opening 3 (see FIG. 2A) and the disk stack 40 and is vertically provided along the peripheral rim of the lower rotor plate 51a with neighboring the notch 51e. The gear 51f is an engaged portion for opening/closing the shutter 4 (see FIG. 2A) from outside of the magnetic disk cartridge 1, and is formed at a peripheral rim of the lower rotor plate 51a within a predetermined range with the neighboring shutter plate 51b.

The upper rotor 52 is designed to be substantially symmetric to the lower rotor 51: the upper rotor 52 comprises an upper rotor plate 52a similar to the lower rotor plate 51a; on the upper rotor plate 52a are formed a central opening 52c fitting outside the rib 37 of the upper plate 30, a notch 52e corresponding to the depression 34, and a rib 52d corresponding to the upper rotor support groove 38. In addition, at a portion adjacent to the notch 52e of a peripheral rim of the upper rotor plate 52a is formed a shutter groove 52b, corresponding to the shutter plate 51b of the lower rotor 51. The lower rotor 51 and the upper rotor 52 are designed to integrally rotate by the shutter groove 52b and upper end rim of the shutter plate 51b engaging.

The upper rotor 52 is rotationally freely supported by the upper plate 30 by the central opening 52c fitting outside the rib 37 of the upper plate 30, and the rib 52d engaging in the upper rotor support groove 38. Meanwhile, the upper rotor 52 is prevented from dropping from the upper plate 30 by a stop member 53. The stop member 53 comprises a cylindrical portion 53a inserted in the rib 37 (see FIG. 3) and a flange 53b formed at one end of the cylindrical portion 53a; the cylindrical portion 53a is inserted in the central opening 52c from a lower side of the upper rotor 52 and is fixed at the rib 37 by ultrasonic welding, adhesion, and the like.

Figure 5:
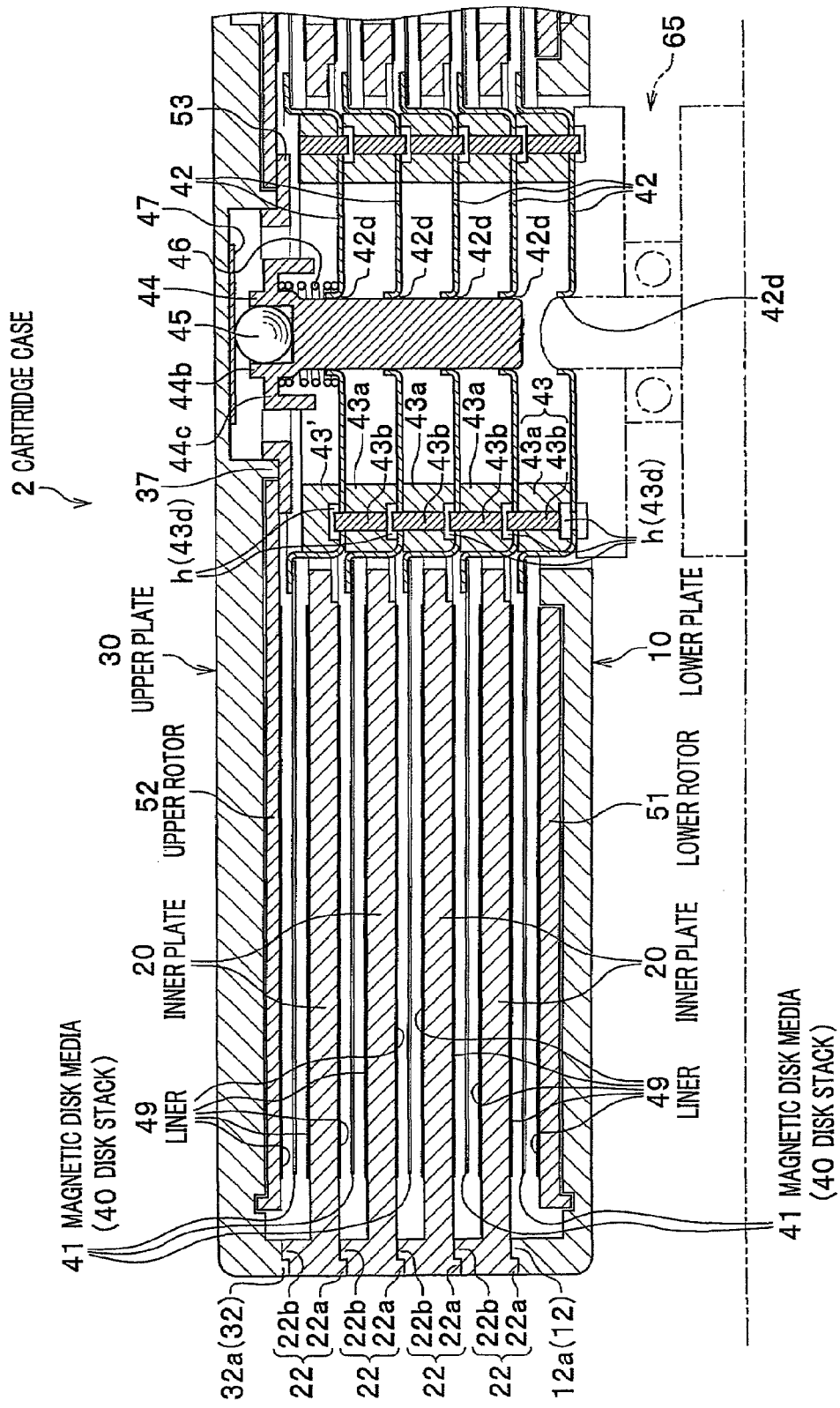
FIG. 5 is a partially enlarged drawing of FIG. 4.

As an enlarged section drawing shown in FIG. 5, an upper face of the lower rotor 51, upper and lower faces of the inner plates 20, and a lower face of the upper rotor 52 are faces opposing the magnetic disk media 41, where liners 49 are affixed across portions opposing the media 41, respectively.

The liners 49 consist of, for example, a non-woven cloth such as a polyester fiber and a blended fabric fiber of rayon and polyester Next will be described a stack structure of the lower plate 10, the inner plates 20, and the upper plate 30.

In the rib 12 of the lower plate 10, as shown in FIG. 5, an inside thereof is formed higher by one step than an outside thereof, and thereby a male type step portion 12a is formed; each rib 22 of the inner plates 20 forms a female type step portion 22a protruding downward at outermost periphery, and thus a periphery of the male type step portion 12a and an inner perimeter of the female type step portion 22a become able to be fitted. In addition, when the lower plate 10, the inner plates 20, and the upper plate 30 are fastened by the screws 91 (see FIG. 1), an upper face of the male type step portion 12a and a corresponding portion of a lower face of the lowermost inner plate 20 are designed to be contacted. Thus, because the rib 12 of the lower plate 10 and the rib 22 of the inner plate 20 are sealingly abutted and fitted each other, an invasion of dust into the cartridge case 2 from outside is prevented.

Similarly, any adjacent two of the inner plates 20, and the uppermost inner plate 20 and the upper plate 30 are stacked by being sealingly abutted and fitted each other. In other words, on an upper face of each of the inner plates 20 is formed a male type step portion 22b where an inside of the upper face is formed higher by one step; at a rib 32 of the upper plate 30 is formed a female type step portion 32a of which outermost periphery protrudes downward by one step. And the male type step portion 22b of one inner plate 20 and the female type step portion 22a of an upper adjacent inner plate 20 are sealingly abutted and fitted each other; the male type step portion 22b of the uppermost inner plate 20 and the female type step portion 32a of the upper plate 30 are sealingly abutted and fitted, and stacked. Thus any adjacent two of the ribs 12, 22, 32 are sealingly abutted and fitted each other, and dust from outside is prevented from invading into the cartridge case 2. In addition, as soon as the lower plate 10, the inner plates 20, and the upper plate 30 are stacked, the side wall 13 of the cartridge case 2 is configured. Furthermore, because the lower plate 10, the inner plates 20, and the upper plate 30 are accurately positioned relative to each other, and respective relative movements go away by being sealingly abutted and fitted each other, the rigidity of the cartridge case 2 is improved.

In addition, both of the female type step portion 22a and the male type step portion 22b protrude from the main plate 21 beyond a thickness of the liner 49. Therefore, after affixing the liners 49 on the inner plates 20 and making an assembly, then even if placing it on a work bench, the liners 49 do not contact the work bench, and accordingly, are not contaminated with dust and the like.

Such the configuration of the cartridge case 2 by stacking the inner plates 20 facilitates a change of a number of the magnetic disk media 41; although a height change of the side wall 13 and that of the shutter plate 51b are requested, a number of housing units of the magnetic disk media 41 formed within the cartridge case 2 can be changed only by mainly changing a number of the inner plates 20.

Next will be described the magnetic disk media 41 and a stack structure thereof. The magnetic disk media 41 are ones where magnetic paint is coated on both faces of a resin sheet, for example, such as polyester.

Figure 6:
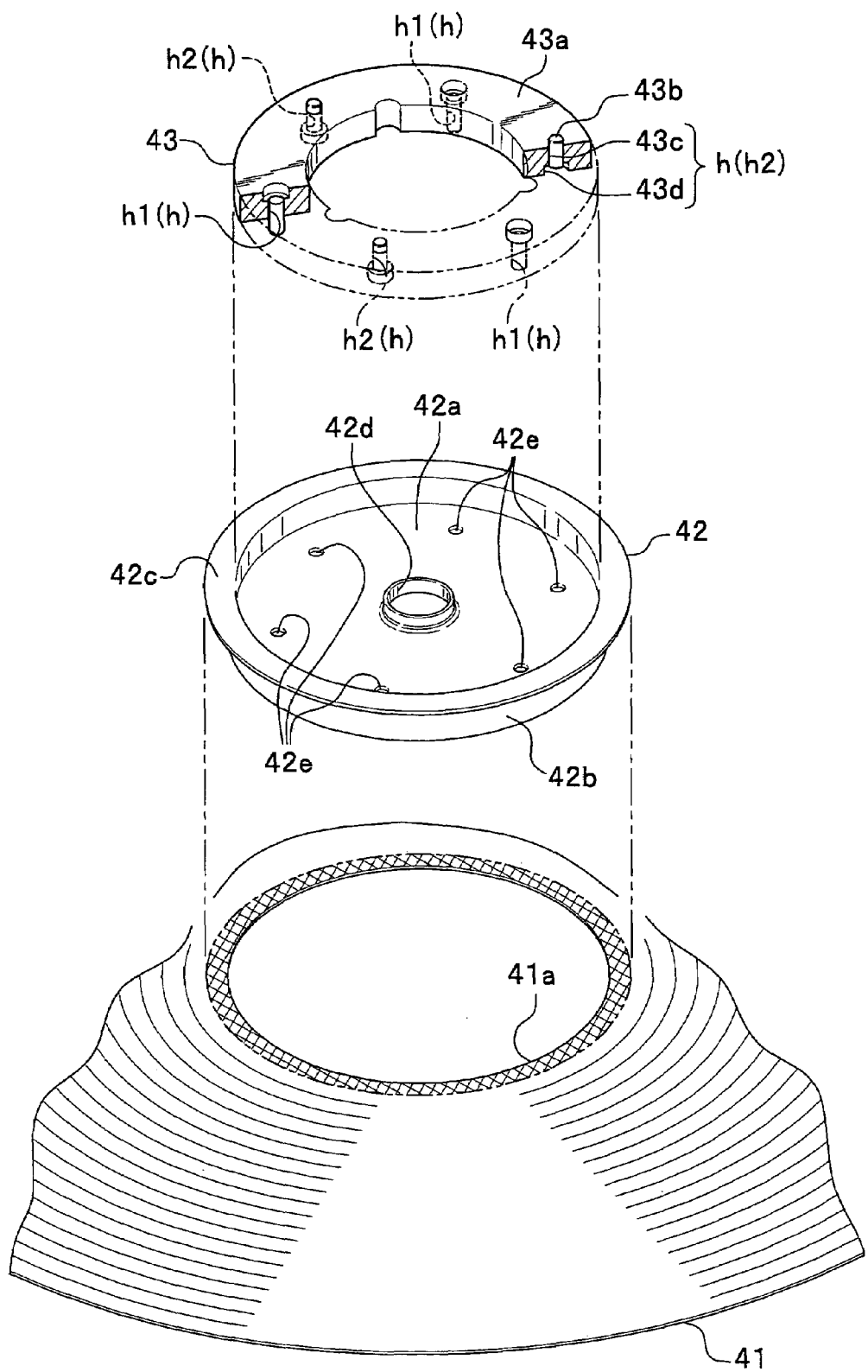
FIG. 6 is an exploded perspective view showing a stack structure of magnetic disk media.

As shown in FIG. 6, each of the center cores 42 is substantially made in a hat form with draw forming a metal plate by press: the center core 42 is mainly configured of a circular bottom plate 42a, a low cylindrical side wall 42b rising from peripheral rim of the bottom plate 42a, and a flange 42c widening in an outer diameter direction from an upper end of the side wall 42b. At the center of the bottom plate 42a is formed a center hole 42d, and at the rim of the plate 42a are formed six small holes (locking holes) 42e at a distance of 60 degrees, making the center hole 42d a center thereof. In other words, the small holes 42e are arranged equidistantly along a circle whose center is a rotation axis of a spacer 43 to be described later.

A spacer 43 is provided between adjacent center cores 42, keeps a distance of each of the center cores 42, stops a rotation between each of the center cores 42, and functions so that the stacked magnetic disk media 41 integrally rotate. The spacer 43 is mainly configured of a main body portion 43a shaped like a ring from a resin and metallic pins (locking protrusions) 43b pressed into the main body portion 43a. In the main body portion 43a are formed six penetration holes h at positions corresponding to the small holes 42e of the center core 42, wherein each of the penetration holes h consists of a small diameter hole portion 43c, where the pin 43b is pressed, and a large diameter hole portion 43d that is coaxial with and slightly larger in diameter than the small diameter hole portion 43c. The six penetration holes h are designed to be upside down in any two adjacent ones. In other words, penetration holes h2 of both adjacent penetration holes h1, where each the large diameter hole portion 43d is positioned at an upper side thereof, are arranged so that the large diameter hole portion 43d is positioned at a lower side thereof.

Into each of the small diameter portions 43c is pressed each one pin 43b from upper/lower sides thereof, one end of the pin 43b is positioned at a boundary of the large diameter hole portion 43d and the small diameter hole portion 43c, and the other end thereof protrudes outside the small diameter portion 43c. The large diameter hole portion 43d serves a function of a clearance at ends of pins 43b of adjacent spacers 43.

As shown in FIG. 5, the spacers 43 are provided between adjacent center cores 42, respectively. One pin 43b protruding toward a lower side of each of the spacers 43 enters in a small hole 42e of one center core 42 at the lower side of the spacer 43, and stops a rotation relative to the center core 42 at the lower side. If there is another spacer 43 at a still lower side than the center core 42 at the lower side, a floating-up of the spacer 43 for the center core 42 is prevented by the distal end of the pin 43b entering the large diameter hole portion 43d in the spacer 43 at the lower side. The other pin 43b protruding toward an upper side of the spacer 43 enters in a small hole 42e of the other center core 42 at the upper side of the spacer 43, and stops a rotation relative to the center core 42 at the upper side. If there is another spacer 43 at a still upper side than the center core 42 at the upper side, the top end of the pin 43b enters in the large diameter hole portion 43d in the spacer 43 at the upper side.

Meanwhile, because at an upper side the uppermost center core 42 has no center core 42 to stop a rotation thereof, at the upper side is arranged a thin top spacer 43' in thickness where the pin 43b is protruded only downward.

As described above, the pins 43b of the spacer 43, 43' are fitted into the small holes 42e of the center core 42 and the spacer 43, 43' is fixed to the center core 42, thereby engaging the spacer 43, 43' with the center core 42. Therefore, a plurality of center cores 42 are assembled integrally (FIG. 5), so that the rotational stability of the center core 42 can be improved.

Figure 7:
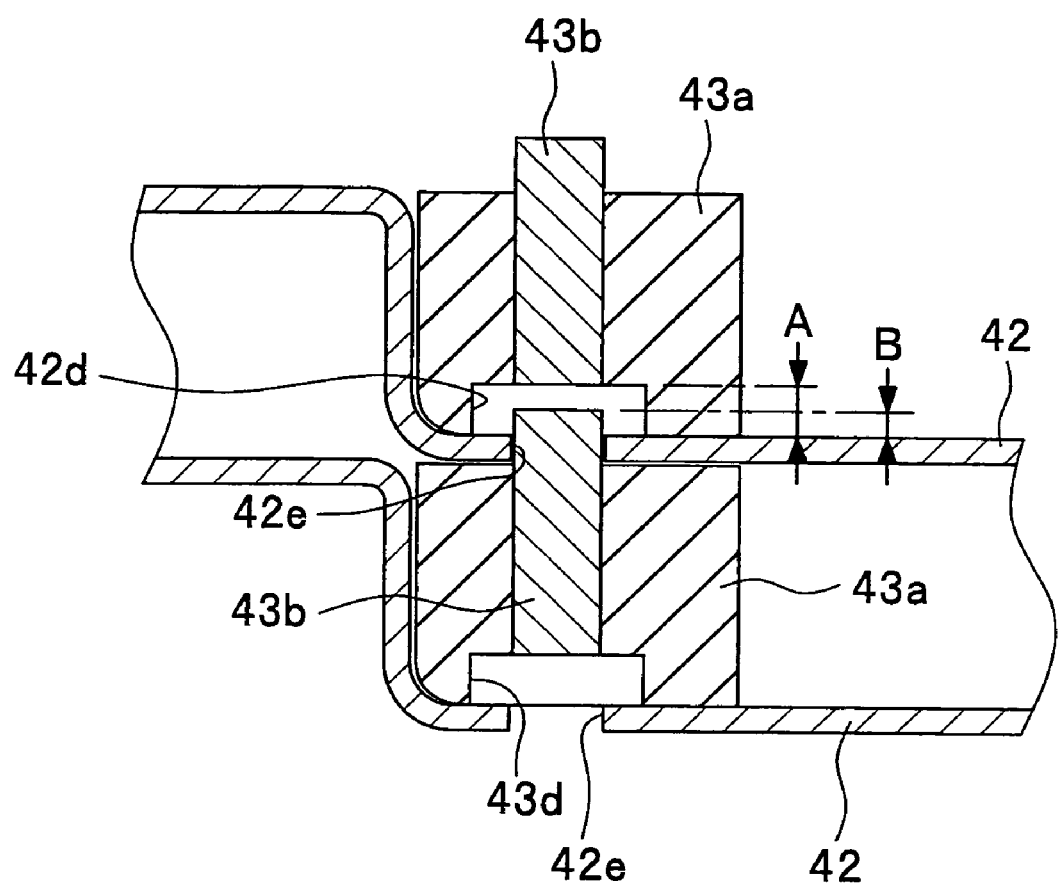
FIG. 7 is an explanatory view showing a depth of a large diameter hole portion of the center core.

Further, in this instance, the distal end of the pin 43b of the spacer 43, 43' protrudes from the center core 42 as illustrated in FIG. 5. Considering the pins 43b protruding upwardly from the spacer 43, as shown in FIG. 7, the protrusion amount B of each pin 43b that protrudes from the corresponding small hole 42e becomes smaller than the depth A of the recess of each large diameter hole portion 43d. This can also be said to the pins 43b protruding downwardly from the spacer 43. Therefore, the engagement can be improved between the pins 43b of the spacer 43, 43' and the center core 42, so that the rotational stability of the center core 42 will be enhanced further.

The center core 42 excels in workability because it can be processed as a single part. In this instance, a metal mold can be used for manufacturing the center core 42 as a single part, which is advantageous in the cost.

Further, the center core 42 can be inspected as a single part, thereby improving handleability. In this instance, if the center cores 42 that have been passed the inspection are selected and assembled, it is possible to improve the probability to pass the product inspection.

The center plate 47 is a slide member affixed at the center of an inner face of the upper plate 30, that is, on a flat face of an inside of the rib 37. The center plate 47 can be composed of, for example, a material excellent in sliding ability and abrasion resistance such as polyoxymethylene and ultra high molecular weight polyethylene.

Although the bearing ball 45 consists of a sphere made of, for example, steel used for a ball bearing, it may also be composed of a material excellent in sliding ability and abrasion resistance, for example, such as polytetrafluoroethylene and polyoxymethylene. The bearing ball 45 is arranged within the ball holding portion 44b of the coupling shaft 44, abuts with the bottom face of the ball holding portion 44b; and a center of an inner face of the upper plate 30, that is, the center plate 47 by a point contact, and rotationally supports the disk stack 40.

In the compression coil spring 46 one end (upper end) is held by the spring holding portion 44c of the coupling shaft 44; the other end (lower end) abuts with an upper face of the uppermost center core 42, and energizes the stacked center cores 42 to the side of the lower plate 10, that is, to the side of the spindle 65 of the magnetic disk drive. Thus the center cores 42 do not jounce within the cartridge case 2, and the fluctuation of the magnetic disk media 41 is prevented in rotation thereof.

Figure 4:
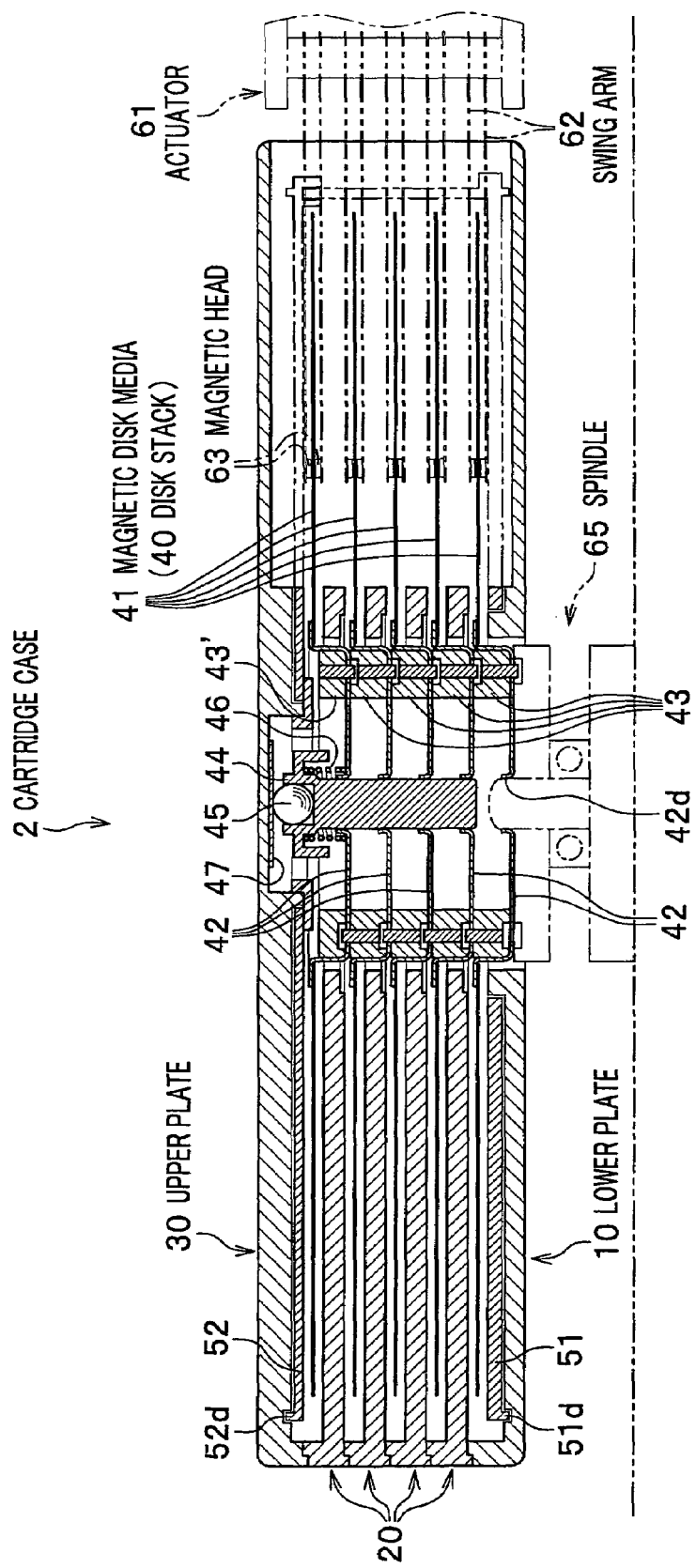
FIG. 4 is a section view taken along the line IV-IV of FIG. 2B with the magnetic disk cartridge loaded on a magnetic disk drive.

A magnetic disk drive for recording/reproducing data for the magnetic disk cartridge 1 rotates, as shown in FIG. 4, the disk stack 40 by the spindle 65. The spindle 65 attracts the lowermost center core 42 by magnetic force, enters in the center hole 42d of the center core 42, and thereby matches an axis thereof with that of the disk stack 40. At this time, because the spindle 65 slightly lifts up the center cores 42 with resisting an energizing force of the compression coil spring 46, as shown in FIGS. 4 and 5, each of the magnetic disk media 41 is positioned at center of a space formed between the lower rotor 51 and the lowermost inner plate 20, between upper and lower inner plates 20, and between the uppermost inner plate 20 and the upper rotor 52. The magnetic heads 63 are provided at top ends of swing arms 62. Each of the magnetic heads 63 is arranged on both faces of each of the magnetic disk media 41.

Figure 2B:
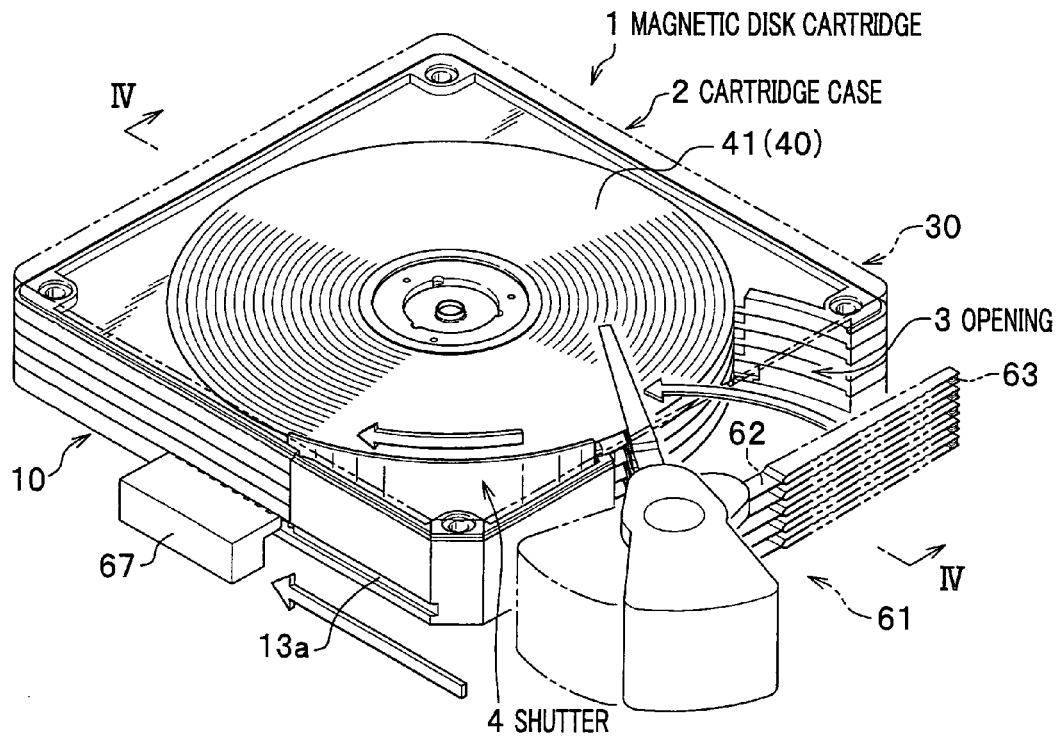
FIG. 2B is an external perspective view of the magnetic disk cartridge with the shutter opened.

The magnetic disk cartridge 1 thus described can prevent, when not in use as shown in FIG. 2A, an invasion of dust thereto by closing the opening 3 with rotating the shutter 4 in a counterclockwise direction of the drawing; in use thereof as shown in FIG. 2B, when loaded on the magnetic disk drive, the shutter open gear 67 fits in the groove 13a, is guided thereby, engages in the gear 51f, and rotates the shutter 4 in a clockwise direction of the drawing.

In addition, the disk stack 40 rotates by the spindle 65 rotating. After then, the swing arms 62 rotate by being driven with an actuator 61, and each of the magnetic heads 63 are moved onto each face of the magnetic disk media 41.

When recording data on the magnetic disk media 41 with the magnetic heads 63, the data is recorded thereon by sending a signal to the magnetic heads 63 by a control circuit not shown; when reproducing data from the magnetic disk medium 41, a signal is output by detecting a change of a magnetic field on the medium 41 with the magnetic heads 63a.

At this time, dust on the magnetic disk media 41 is removed by the liners 49 appropriately touching respective media 41.

After the use of the magnetic disk cartridge 1, the magnetic heads 63 are retracted from the cartridge case 2, thereafter ejects the magnetic disk cartridge 1; thereby the gear 51f is driven by the shutter open gear 67, and the shutter 4 closes the opening 3.

Thus because the magnetic disk cartridge 1 has a plurality of the magnetic disk media 41, data transfer can be performed at a higher speed by simultaneously accessing data with a plurality of magnetic heads 63.

In addition, because the cartridge case 2 is configured by stacking up the inner plates 20, it is easy to perform a specification change of making a number of magnetic disk media 41 a different one. Then, in assembling the magnetic disk cartridge 1, because the magnetic disk media 41 can be handled with being placed on the inner plates 20 and the lower rotor 51 built in the lower plate 10, an occasion of touching the magnetic disk media 41 can be reduced and a quality of the cartridge 1 can be further stablized.

In addition, because each of the inner plates 20 is stacked on the lower plate 10 or another inner plate 20 and is fixed, the magnetic disk cartridge 1 can make it higher a parallelism to the magnetic disk media 41, can stabilize a rotation of the media 41, and enable a higher speed rotation of the media 41, furthermore a higher speed of a data transfer.

Thus, although the embodiment of the present invention is described, the invention is not limited thereto and can be embodied with being changed as needed. For example, although in the embodiment the magnetic disk medium 41 is applied to a recording disk medium, an optical recording medium where data is recorded by light can also be applied thereto.

In addition, although in the embodiment the lower plate 10, the inner plates 20, and the upper plate 30 are fastened and fixed by the screws 91, they can also be integrally fixed by any of adhesion and welding.

Furthermore, three pins 43b are provided on the spacer 43 at the upper side and the lower side, respectively. However, the number of pins 43b may be one, two or more than four.

What is claimed is:

1. A recording disk cartridge comprising:
a plurality of flexible recording disk media integrally rotatably housed within a cartridge case, said recording disk media being fixed to respective center cores which are stacked one on another through a spacer, the cartridge case comprising:
a lower plate for configuring a lower wall parallel to the plurality of the recording disk media;
at least one inner plate that is stacked and fixed on the lower plate, and partitions the plurality of the recording disk media; and
an upper plate that is stacked and fixed on said inner plate, and configures an upper wall of the cartridge case,
wherein each spacer is provided with locking protrusions at upper and lower surfaces thereof, and wherein each center core is provided with locking holes for engagement with the locking protrusions of adjacent spacers,
wherein said locking protrusions are arranged equidistantly along a circle having center which is a rotation axis of the spacer, and
wherein said locking protrusions are arranged so as to produce alternately at an upper side and lower side of the spacer.

2. A recording disk cartridge according to claim 1, wherein the number of locking protrusions for engagement with the upper side and the lower side of the center core is at least two each.

3. A recording disk cartridge according to claim 1, wherein said locking holes are penetration holes formed in the center core, wherein a height of each locking protrusion is greater than a thickness of the center core, and wherein the spacer is provided with recesses, a depth of each recess being greater than a protrusion amount of each locking protrusion that protrudes from the corresponding locking hole.

4. A recording disk cartridge according to claim 2, wherein said locking holes are penetration holes formed in the center core, wherein a height of each locking protrusion is greater than a thickness of the center core, and wherein the spacer is provided with recesses, a depth of each recess being greater than a protrusion amount of each locking protrusion that protrudes from the corresponding locking hole.

5. A recording disk cartridge according to claim 1, wherein:
said center core comprises a circular bottom plate, a cylindrical side wall rising from a peripheral rim of said bottom plate, and a flange widening in an outer diameter direction from an upper end of said side wall; and
a plurality of locking holes are provided around a center hole located in center of said bottom plate to surround said center hole.

6. A recording disk cartridge according to claim 5, wherein:
said spacer comprises a ring-shaped main body portion having a plurality of penetration holes; and
said locking protrusions are pins pressed into said penetration holes.

7. A recording disk cartridge according to claim 6, wherein:
said penetration holes are formed in positions corresponding to said locking holes of said center core; and
each of said penetration holes is formed so that a small diameter hole portion into which said pin is pressed is coaxially adjacent to a large diameter hole portion whose diameter is larger than said small diameter hole portion.

8. A recording disk cartridge according to claim 7, wherein adjacent penetration holes of said spacer are arranged such that the small diameter hole portion and the large diameter hole portion are located upside down.

9. A recording disk cartridge according to claim 8, wherein:
an end of said pin is located on a boundary between said small diameter hole portion and said large diameter hole portion; and
the other end of said pin protrudes outside said small diameter hole portion.

10. A recording disk cartridge according to claim 8, wherein when said center cores are stacked one on another through the spacer, each of said pins of the spacer extends through the corresponding locking hole of each center core and positions in said large diameter hole portion of another adjacent spacer.

11. A recording disk cartridge according to claim 1, wherein:
said spacer comprises a ring-shaped main body portion having a plurality of penetration holes; and
said locking protrusions are pins pressed into said penetration holes.

12. A recording disk cartridge according to claim 11, wherein:
said penetration holes are formed in positions corresponding to said locking holes of said center core; and
each of said penetration holes is formed so that a small diameter hole portion into which said pin is pressed is coaxially adjacent to a large diameter hole portion whose diameter is larger than said small diameter hole portion.

13. A recording disk cartridge according to claim 12, wherein adjacent penetration holes of said spacer are arranged such that the small diameter hole portion and the large diameter hole portion are located upside down.

14. A recording disk cartridge according to claim 13, wherein:
an end of said pin is located on a boundary between said small diameter hole portion and said large diameter hole portion; and
the other end of said pin protrudes outside said small diameter hole portion.

15. A recording disk cartridge according to claim 1, wherein said recording disk medium is a magnetic disk medium.

16. A recording disk cartridge according to claim 1, wherein said recording disk medium is an optical disk medium.

17. A recording disk cartridge comprising:
a plurality of flexible recording disk media integrally rotatably housed within a cartridge case, said recording disk media being fixed to respective center cores which are stacked one on another through a spacer, the cartridge case comprising:
a lower plate for configuring a lower wall parallel to the plurality of the recording disk media;
at least one inner plate that is stacked and fixed on the lower plate, and partitions the plurality of the recording disk media; and
an upper plate that is stacked and fixed on said inner plate, and configures an upper wall of the cartridge case,
wherein each spacer is provided with locking protrusions at upper and lower surfaces thereof, and wherein each center core is provided with locking holes for engagement with the locking protrusions of adjacent spacers, and
wherein said locking hole are penetration holes formed in the center core, wherein a height of each locking protrusion is greater than a thickness of the center core, and wherein the spacer is provided with recesses, a depth of each recess being greater than a protrusion amount of each locking protrusion that protrudes from the corresponding locking hole.

\* \* \* \* \*